R. R. BEATTY.
FARM TRACTOR.
APPLICATION FILED OCT. 29, 1915.
1,240,650.
Patented Sept. 18, 1917.
2 SHEETS—SHEET 2.
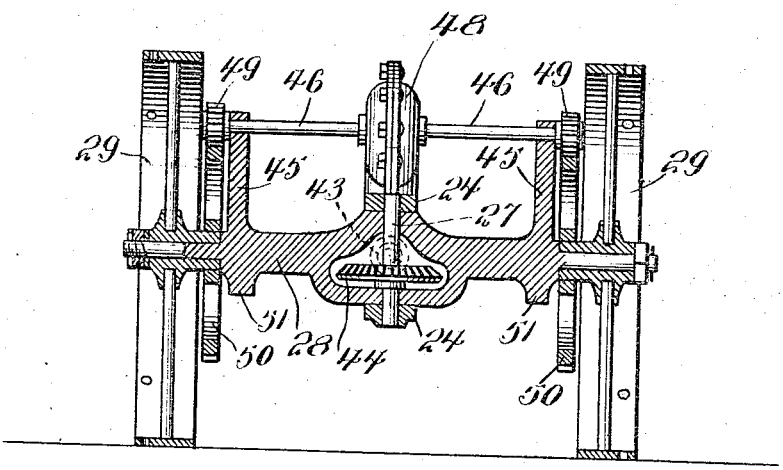
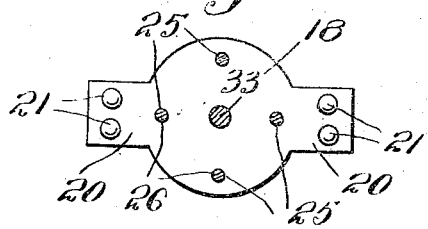
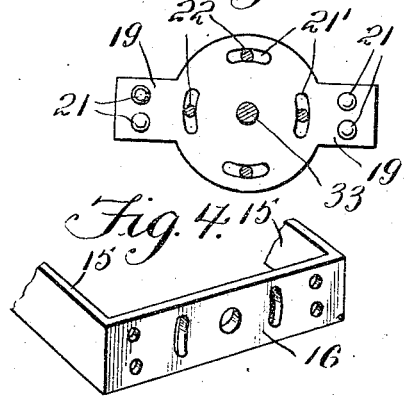
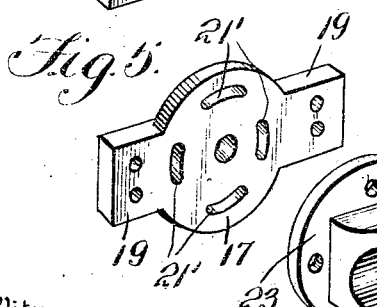
Inventor
Robert R. Beatty

UNITED STATES PATENT OFFICE.

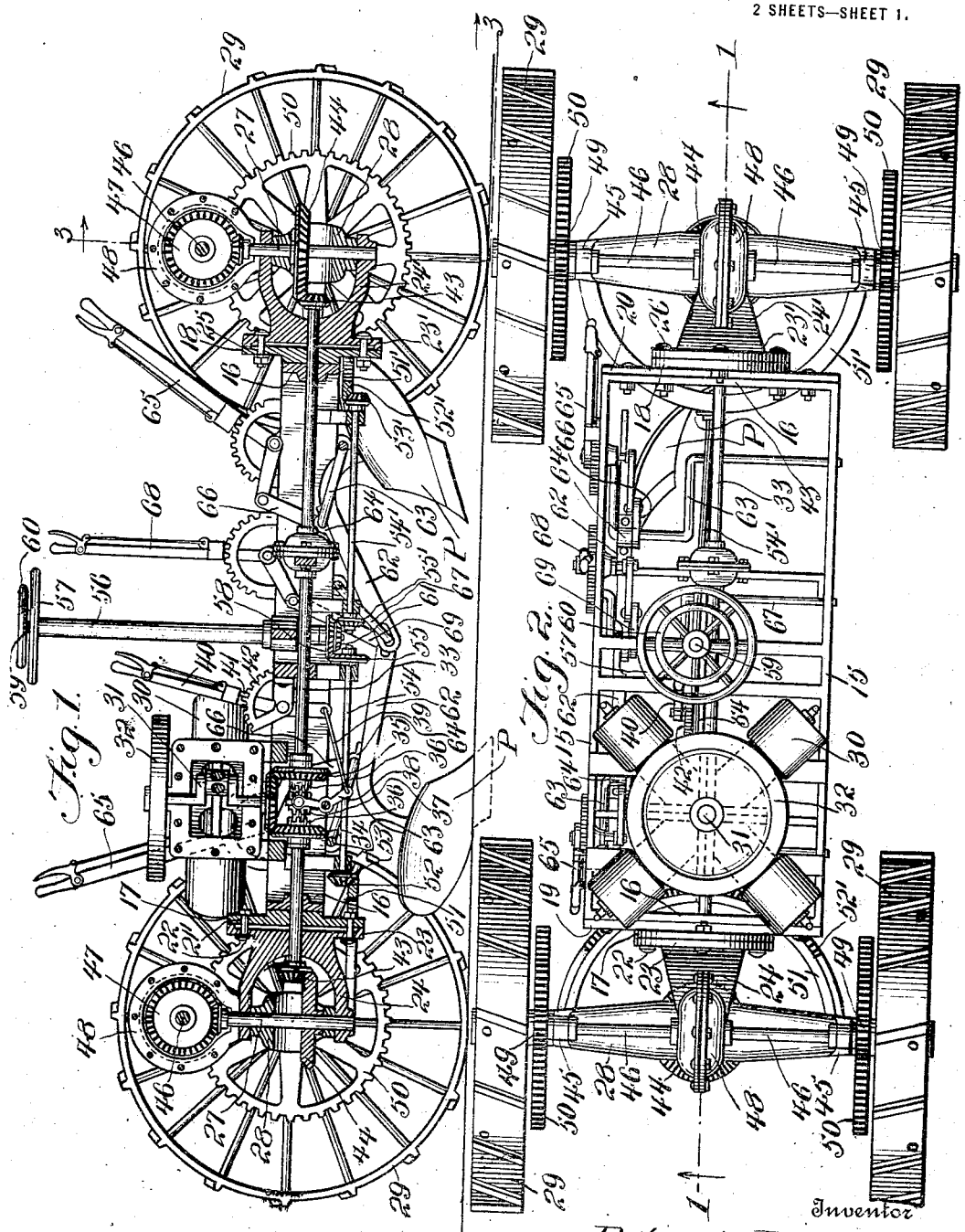

ROBERT R. BEATTY, OF SARVER, PENNSYLVANIA.

FARM-TRACTOR.

1,240,650.  Specification of Letters Patent.  Patented Sept. 18, 1917.

Application filed October 29, 1915. Serial No. 58,671.

*To all whom it may concern:*

Be it known that I, ROBERT R. BEATTY, a citizen of the United States, residing at Sarver, in the county of Butler and State of Pennsylvania, have invented new and useful Improvements in Farm-Tractors, of which the following is a specification.

This invention relates to tractors for agricultural use and its prime object is to produce a simple and efficient tractor for operating plows and the like.

A further object of the invention is to produce a simple and improved farm tractor which may be conveniently and effectively used for drawing plows or gangs of plows facing in opposite directions, means being provided whereby the plow supporting vehicle may be driven first in one direction and then in the other direction to produce the requisite furrows and steering means being also provided whereby the vehicle or frame may be moved obliquely or transversely when the end of the field is reached for the purpose of placing the plows in position for the return trip.

A further object of the invention is to simplify and improve the construction of the carrying frame, the driving mechanism and the steering gear.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a longitudinal vertical sectional view of a machine constructed in accordance with the invention, taken substantially on the line 1—1 in Fig. 2.

Fig. 2 is a top plan view.

Fig. 3 is a transverse sectional view taken on the line 3—3 in Fig. 1.

Fig. 4 is a perspective detail view showing one end of the frame of the machine.

Fig. 5 is a perspective detail view of a turn table adapted to coöperate with a rocking axle supporting member.

Fig. 6 is an elevation of said turn table.

Fig. 7 is an elevation of a supporting disk.

Fig. 8 is a perspective detail view of an axle supporting fork member.

Corresponding parts in the several figures are denoted by like characters of reference.

The frame of the improved machine, which is preferably of rectangular shape, is composed of side members 15 and end members 16. 17, 18 are circular disks having laterally extending lugs or wings 19, 20 for the passage of connecting members, such as bolts 21, whereby said disks are secured exteriorly on the end members of the frame. The disks 17, 18 are substantially alike, except that the disk 17 which constitutes a turn table is provided with arcuate slots 21' for the passage of connecting members 22, whereby it is connected with a rocking axle supporting member consisting of a disk 23 having a forked bracket 24 which will be capable of rocking about the axis of the turn table. The disk 18 at the other end of the frame is provided with apertures 25 for the passage of bolts 26 by means of which a disk 23' having a forked bracket 24' is rigidly mounted in position, it being understood that the construction of the disk and bracket 23', 24' and related parts is similar to that of the disk 23 and the bracket 24 in all respects, except that the disk 23 and related parts is capable of rocking about the axis of the turn table.

Each of the forked brackets 24 at the two ends of the frame structure supports a substantially vertical shaft 27 on which an axle 28 is mounted for swinging movement in a substantially horizontal plane, each axle being provided at the ends thereof with ground wheels 29.

The main frame supports a motor 30 which, as illustrated, may consist of an internal combustion motor of multiple cylinder type, said motor having a vertically disposed driven shaft 31 equipped with a fly wheel 32. A main shaft 33 extending longitudinally through the frame of the machine is provided with opposed bevel gears 34, 35, each having a clutch member 36 adapted to be engaged by a clutch sleeve 37 which is splined on the main shaft intermediate the bevel gears. The clutch sleeve 37 is actuated by a shipping lever 38, one arm of which is connected by a link 39 with a hand lever 40 having a stop member 41 adapted to engage a rack segment 42, whereby the hand lever and related parts may be locked and retained in adjusted position; it being understood that by means of said hand lever the clutch sleeve may be moved into engagement with the clutch members of the gear wheels 34, 35, respectively, or to an intermediate neutral position. By this mechanism it will be seen that the main shaft may be driven and reversed or permitted to remain stationary when the motor is in operation.

The main shaft 33 is provided at the ends thereof with bevel pinions 43, said pinions meshing with bevel gears 44 on the respective shafts 27 which will thus be driven. The axles 28 are each provided with upwardly extending brackets 45 affording bearings for a counter shaft composed of sections 46 and a differential gear conventionally indicated at 47, and contained in a casing 48. The shaft sections 46 are provided with pinions 49 meshing with spur wheels 50 associated with the respective ground wheels 29 which will thus be driven.

The respective axles at the two ends of the frame are provided each with a sector 54, 54' which are disposed in axial alinement said toothed portion being engaged by pinions 53, 53' carried by longitudinal shafts 54, 54' which are disposed in axial alinment, said shafts being equipped at their inner ends with bevel gears 55, 55'. A tubular steering post 56, which is provided at its upper end with a hand wheel 57, carries at its lower end a bevel pinion 58 which meshes with the bevel gear 55 carried by the shaft 54. An auxiliary steering shaft 59 which extends through the tubular shaft 56 carries at its upper end a hand wheel 60 and at its lower end a bevel pinion 61 meshing with the bevel gear 55' carried by the shaft 54'.

It will be readily seen that by operating the steering posts 56, 59 simultaneously by their respective hand wheels, the two wheel carrying axles may be swung about the axes of the respective shafts 27 in such a fashion as to preserve the parallelism between the ground wheels at the two ends of the frame structure, thus permitting the entire machine to be moved transversely when desired. The purpose of this is to enable the plow or plows carried by the machine, as will be hereinafter described, to be moved or shifted at the end of a furrow to the proper position for starting a new furrow alongside of that which has already been made. It is, furthermore, obvious that by proper manipulation of the steering posts the two axles or either one of them may be properly actuated for ordinary steering purposes, as when it shall be desired to turn a corner. A simple locking device might be provided to enable the two steering posts to be simultaneously operated, but inasmuch as this result may be attained by the operator grasping hold of both hand wheels at the same time, it is considered unnecessary to specifically illustrate such device.

Plows P including beams 62 are operatively supported adjacent to the two ends of the frame of the machine by means including crank shafts 63 connected with the plow beams at 64 for the purpose of raising and lowering the mold boards, said shafts being operable by hand levers 65 and connecting links 66. The noses of the plow beams may be tilted by means of a crank shaft 67 operable by means of a hand lever 68 and connecting link 69, thereby enabling the points of the respective plows to be tilted for the purpose of entering into the ground to the requisite depth. It is obvious that in lieu of the single plows shown in the drawings, gangs of plows, properly arranged, may be used.

It will be obvious from the foregoing description, taken in connection with the drawings hereto annexed, that the plows at the two ends of the machine frame may be raised from the ground when the machine is traveling from place to place. When the machine is to be used for plowing, the plow at one end of the frame is lowered to ground engaging position, and the motor having been started, the transmission gear is set to transmit motion in the desired direction to the ground wheels. When the end of a furrow has been almost reached, the steering gear is actuated to move the ground wheels to an angular position with respect to the frame, but in parallelism with respect to each other, causing the machine to move obliquely to one side until the proper position has been reached for starting the second furrow. The plows are now reversed; that is to say, the plow which was previously in ground engaging position is lifted from the ground, while the other plow is lowered to ground engaging position, the transmission gear is reversed, and the steering gear is operated restoring the wheels to parallelism with respect to the frame, causing the machine to travel in a path parallel to the furrow previously made, and causing a second furrow to be made. It will be understood that by proper manipulation of the steering gear, the two axles may be swung or moved in opposite directions, thereby facilitating the turning of a sharp corner. In passing over rough ground the axle which is carried by the rocking element 23 will enable equilibrium to be preserved, it being, of course, understood that the main shaft 33 extends axially through the turn table 23 and through the forked bracket 24, as well as through the disk 23' and the forked bracket 24'.

Having thus described the invention, what is claimed as new, is:—

1. In a machine of the class described, disks mounted on the ends of the frame, axle carrying fork members having disks connected with the first mentioned disks, one of said fork members being supported for rocking movement about the axis of the disk, a main shaft extending longitudinally through the frame and through the axle supporting members at the ends thereof, shafts supported vertically in the respective fork members, ground wheel carrying axles mounted on the vertical shafts for horizontal swinging movement, means for driving and for reversing the main shaft, and means for transmitting motion from the main shaft to the ground wheels on the respective axles, said means including counter shafts and differential gears.

2. In a machine of the class described, disks mounted on the ends of the frame, axle carrying fork members having disks connected with the first mentioned disks, one of said fork members being supported for rocking movement about the axis of the disk, a main shaft extending longitudinally through the frame and through the axle supporting members at the ends thereof, shafts supported vertically in the respective fork members, ground wheel carrying axles mounted on the vertical shafts for horizontal swinging movement, means for driving and for reversing the main shaft, and means for transmitting motion from the main shaft to the ground wheels on the respective axles, said means including counter shafts and differential gears, each axle being provided with a toothed sector; and steering gear including independently operable pinions engaging the toothed sectors.

3. In a machine of the class described, disks mounted on the ends of the frame, axle carrying fork members having disks connected with the first mentioned disks, one of said fork members being supported for rocking movement about the axis of the disk, a main shaft extending longitudinally through the frame and through the axle supporting members at the ends thereof, shafts supported vertically in the respective fork members, ground wheel carrying axles mounted on the vertical shafts for horizontal swinging movement, means for driving and for reversing the main shaft, and means for transmitting motion from the main shaft to the ground wheels on the respective axles, said means including counter shafts and differential gears, each axle being provided with a toothed sector; and steering gear including independently operable pinions engaging the toothed sectors, and means for independently actuating said pinions including a tubular steering post, an auxiliary steering post extending therethrough, and hand wheels at the upper ends of the two steering posts.

4. In a machine of the class described, a main frame, fork members mounted on the ends thereof, a main shaft extending longitudinally through the frame and the fork members, means for driving and for reversing said shaft, vertical shafts supported for rotation in the fork members, ground wheel carrying axles supported for horizontal swinging movement about the axes of the vertical shafts, and means for transmitting motion to the ground wheels from the main shaft and through the vertical shafts, said means including counter shafts supported above the planes of the respective axles and equipped with differential gears.

5. In a machine of the class described, a main frame, fork members mounted on the ends thereof, a main shaft extending longitudinally through the frame and the fork members, means for driving and for reversing said shaft, vertical shafts supported for rotation in the fork members, ground wheel carrying axles supported for horizontal swinging movement about the axes of the vertical shafts, and means for transmitting motion to the ground wheels from the main shaft and through the vertical shafts, said means including counter shafts supported above the planes of the respective axles and equipped with differential gears, in combination with means whereby the axles may be independently swung about the axes of the vertical shafts.

In testimony whereof I affix my signature in presence of two witnesses.

ROBERT R. BEATTY.

Witnesses:
Wm. Bagger,
H. Hough.